United States Patent
Kim et al.

(10) Patent No.: US 7,307,939 B2
(45) Date of Patent: Dec. 11, 2007

(54) METHOD AND APPARATUS FOR CONTROLLING WRITE POWER IN AN OPTICAL DRIVE

(75) Inventors: Joo-yeup Kim, Gyeonggi-do (KR); Jin-gyo Seo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 132 days.

(21) Appl. No.: 11/100,392

(22) Filed: Apr. 7, 2005

(65) Prior Publication Data

US 2005/0195725 A1 Sep. 8, 2005

Related U.S. Application Data

(62) Division of application No. 10/170,188, filed on Jun. 13, 2002.

(30) Foreign Application Priority Data

Jun. 16, 2001 (KR) ............... 2001-34137
Jul. 30, 2001 (KR) ............... 2001-46036

(51) Int. Cl.
*G11B 7/00* (2006.01)
(52) U.S. Cl. ........... 369/116; 369/53.26; 369/47.52
(58) Field of Classification Search ............. None
See application file for complete search history.

(56) References Cited

U.S. PATENT DOCUMENTS 5,793,736 A 8/1998 Ishimaru et al.
6,738,339 B2 5/2004 Gyo 2002/0159364 A1 10/2002 Miyagawa et al.

FOREIGN PATENT DOCUMENTS

| JP | 2-94128 | 4/1990 |
|----|---------|--------|
| JP | 2001-84628 | 3/2001 |
| JP | 2001-84629 | 3/2001 |
| JP | 2001084629 A * | 3/2001 |
| KR | 1998-78070 | 11/1998 |
| KR | 1998-80258 | 11/1998 |

OTHER PUBLICATIONS

Translation of Mashita et al. (JP 2001-84629A).*
Japanese Patent Office Action issued Oct. 20, 2004, 2 pages.

* cited by examiner

*Primary Examiner*—William R. Korzuch
*Assistant Examiner*—Peter Vincent Agustin
(74) *Attorney, Agent, or Firm*—Staas & Halsey LLP

(57) ABSTRACT

A method and an apparatus which controls write power of an optical driver by optimizing the number of channels used to drive a laser diode in a write mode while stabilizing the level of a write power voltage at an early stage of the write mode. The method of controlling the write power includes checking whether the write power provided to the laser diode included in the optical driver is stable, controlling the write power by increasing the number of channels used to control the write power so as to provide sufficient write power to drive the laser diode in response to the write power provided to the laser diode being unstable, and controlling the write power by using less channels than the channels used in response to the write power being unstable in response to the write power provided to the laser diode being stable. Accordingly, it is possible to reduce the size of a firmware by preventing channels unnecessary to perform a write mode from being used.

14 Claims, 6 Drawing Sheets

RECORD POWER

OVER-DRIVE POWER LEVEL SECTION | BASE LEVEL SECTION | READ LEVEL SECTION

CONTROL SIGNAL FOR OVER DRIVE POWER LEVEL SECTION

CONTROL SIGNAL FOR BASE LEVEL

ENABLE SIGNAL FOR READ CHANNEL

METHOD AND APPARATUS FOR CONTROLLING WRITE POWER IN AN OPTICAL DRIVE

CROSS-REFERENCE TO RELATED APPLICATIONS

This application is a divisional of application number 10/170,188, filled Jun. 13, 2002, now pending.

This application claims the benefit of Korean Patent Application No. 2001-34137 filed on Jun. 16, 2001 and Korean Patent Application No. 2001-46036 filed Jul. 30, 2001, in the Korean Industrial Property Office, the disclosures of which are incorporated herein by reference.

BACKGROUND OF THE INVENTION

1. Field of the Invention

The present invention relates to a method and an apparatus which controls write power in an optical drive, and more particularly, to a method and an apparatus which controls the write power by optimizing the number of channels used to drive a laser diode (LD) in response to performing a writing mode.

2. Description of the Related Art

An optical drive is a device which records/reads data into/from a disk, such as a compact disk or a digital versatile disk. A conventional optical drive stops writing data in an emergency, such as buffer under run, during a write operation, and thus it is not able to write the data normally. Accordingly, techniques to restart the write operation, at a point where the writing of the data is stopped, while performing a write mode have been suggested to obtain normally written data.

However, there is a time difference between the time when the write mode is controlled and the time when a power voltage output from an auto laser diode power control (APC) circuit reaches a stable level. Accordingly, in the case of retrying to write data at a point where the writing of the data is stopped, the writing of the data is generated before the power voltage of the APC circuit reaches the stable level, and therefore hinders the data from being normally written. Thus, some of the data may be lost.

To solve this problem, a technique of stabilizing a voltage of write power at an early stage of a write mode has been suggested. The voltage of the write power is stabilized at an early stage by adding a predetermined percentage of an expected power voltage output from an APC circuit to the expected power voltage of the APC circuit after controlling the write mode.

However, this technique must use an additional channel to drive an LD to add the predetermined percentage of the expected power voltage of the APC circuit to the expected power voltage of the APC circuit. Accordingly, although this technique may stabilize the voltage of the write power and prevent the data from being lost at an early stage of the write mode, such an optical drive must manage the additional channel which becomes unnecessary after the stabilization of the write power voltage. Additionally, the size of a firmware in the optical driver is increased. Furthermore, in the case of controlling a write mode according to this technique, it is impossible to control the voltage of the write power at a level lower than the predetermined percentage of the expected power voltage of the APC circuit while performing the write mode.

SUMMARY OF THE INVENTION

Accordingly, it is an object of the present invention to provide a method and an apparatus which controls write power in an optical driver by optimizing the number of channels used to drive a laser diode (LD) in a write mode while stabilizing a voltage of the write power at an early stage of the write mode.

Additional objects and advantages of the invention will be set forth in part in the description which follows and, in part, will be obvious from the description, or may be learned by practice of the invention.

To achieve the above and other objects of the present invention, there is provided a method of controlling write power in an optical driver having a laser diode, the method comprising checking whether the write power provided to the laser diode is stable, controlling the write power by increasing the number of channels used to control the write power so as to provide sufficient write power to drive the laser diode in response to the write power provided to the laser diode being unstable, and controlling the write power by using less channels than the number of channels used in response to the write power being unstable in response to the write power provided to the laser diode being stable.

According to an aspect of the present invention, the checking of whether the write power provided to the laser diode is stable includes using a signal generated by sampling and holding a predetermined section of an output of a monitor photo diode, wherein the monitor photodiode is included in the optical driver and monitors a light emission of the laser diode.

According to another aspect of the present invention, the write power provided to the laser diode is rapidly stabilized by providing the number of channels used in response to the write power provided to the laser diode being unstable to be greater than the number of channels used in response to the write power being stable by turning off a channel which provides a voltage as much as a predetermined percentage of expected write power.

The method of controlling the write power is performed in response to a write mode being stopped in the optical driver in an emergency and there is a need to resume the write mode.

To achieve the above and other objects, there is provided an apparatus which controls write power in an optical driver, comprising a laser diode which emits light, a monitor photo diode which monitors the amount of the light emitted from the laser diode, and a controller which determines whether the write power provided to the laser diode is stable based on a signal generated by sampling and holding a predetermined section of an output of the monitor photo diode, and controls the write power provided to the laser diode by adjusting the number of channels used according to whether the write power provided to the laser diode is stable.

BRIEF DESCRIPTION OF THE DRAWINGS

These and other objects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
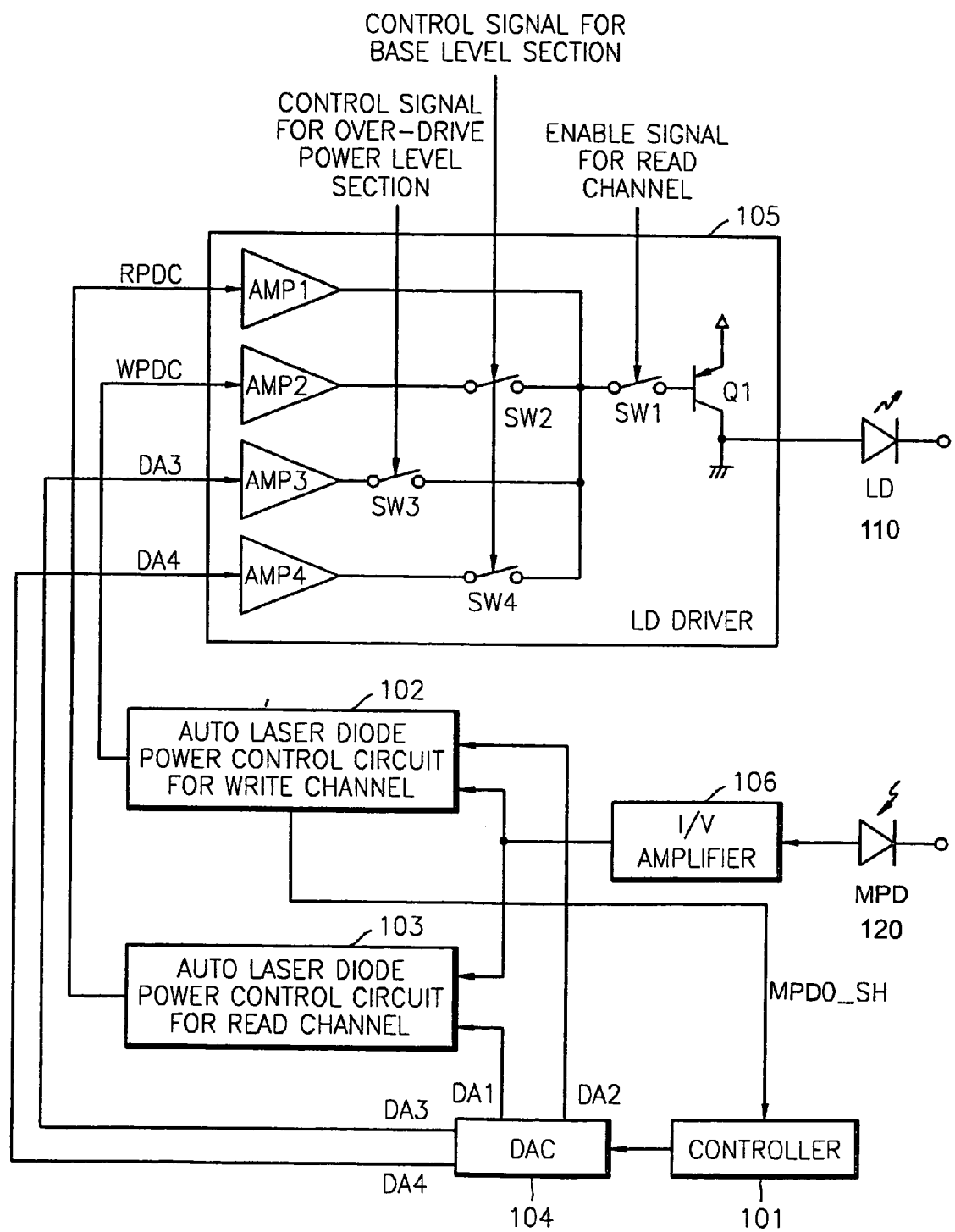
FIG. 1 is a block diagram of an apparatus which controls write power according to an embodiment of the present invention.

Reference will now be made in detail to the embodiments of the present invention, examples of which are illustrated in the accompanying drawings, wherein like reference numerals refer to the like elements throughout. The embodiments are described below in order to explain the present invention by referring to the figures.

FIG. 1 shows a block diagram of an apparatus which controls write power according to an embodiment of the present invention. The apparatus includes a laser diode (LD) 110 which emits light toward a disk (not shown), a controller 101 which controls the write power to be provided to the LD 110, an auto laser diode power control (APC) circuit 102 for a write channel, which provides a write power direct current (WPDC), an APC circuit 103 for a read channel which provides a read power direct current (RPDC), a digital/analog converter (DAC) 104, a laser diode (LD) driver 105 which drives the LD 110, an I/V amplifier 106, and a monitor photo diode (MPD) 120 which monitors the amount of the light emitted from the LD 110.

The controller 101 controls general functions of an optical driver to stabilize the voltage of the write power in a write mode and to optimize the number of channels used to drive the LD 110. In other words, the controller 101 divides the voltage of the write power output from the APC circuit 102 for a write channel into a non-stabilization state and a stabilization state, and controls the voltage of the write power used to drive the LD 110 while managing the number of channels used to control the write power in the non-stabilization state to be greater than the number of channels used to control the write power in the stabilization state. Here, when the voltage level of the write power output from the APC circuit 102 for a write channel is in the non-stabilization state, the optical output level of the LD 110 is not appropriate for a write operation, in other words, the optical output level of the LD 110 is in a non-stabilization state. On the other hand, when the voltage level of the write power output from the APC circuit 102 for a write channel is in the stabilization state, the optical output level of the LD 110 is appropriate for a write operation, in other words, the optical output level of the LD 110 is in a stabilization state.

In a case where writing of data is stopped because of an emergency, such as a buffer under run, the voltage level of the write power output from the APC circuit 102 is recognized as being in the non-stabilization state by a sampled and held output signal of the MPD 120 (referred to as MPDO_SH) transmitted from the APC circuit 102 for a write channel. In response, the controller 101 outputs a reference voltage, an over-drive power voltage, and a predetermined percentage of an expected write power voltage for the APC circuit 102 for a write channel, and a reference voltage, an over-drive power voltage, and a predetermined percentage of an expected write power voltage for the APC circuit 103 for a read channel.

A voltage corresponding to the predetermined percentage of the expected write power voltage is called a write power voltage for an APC circuit. The predetermined percentage may be determined as between 80-90%. In the present embodiment, the controller 101 outputs 80% of the expected write power voltage. The range of the predetermined percentage is determined based on the relationship between the expected write power voltage and a write power voltage provided by another channel, and the time when the optical output status of an LD is stabilized but may be varied according to operational conditions of an optical driver.

Accordingly, the digital/analog converter (DAC) 104 outputs the reference voltage for the APC circuit 103 for a read channel, the reference voltage for the APC circuit 102 for a write channel, the over-drive power voltage, and the predetermined percentage of the expected write power voltage through DA1 through DA4 channels, respectively. The write power voltages output through the DA3 and DA4 channels are directly transmitted to the LD driver 105.

In a case where the level of the write power voltages output from the APC circuit 102 for a write channel is unstable, the controller 101 manages the DA1 through DA4 channels of the DAC 104 to allow the voltages to be output through the DA1 through DA4 channels.

The APC circuit 102 for a write channel provides the output signal MPDO_SH of the MPD 120 to the controller 101, so as to adjust the level of the write power voltage applied to the LD driver 105 and maintain the output power of the LD 110 at a certain level by using the voltage of the output power of the LD 110 fed back through the MPD 120 and the I/V amplifier 106, and the voltage provided through the DA2 channel of the DAC 104. The I/V amplifier 106 amplifies the output signal of the MPD 120 and outputs the amplified output signal of the MPD 120.

The APC circuit 103 for a read channel adjusts the level of a read power voltage applied to the LD driver 105 so as to maintain the output power of the LD 110 at a certain level by using the voltage of the output power of the LD 110 fed back through the MPD 120 and I/V amplifier 106, and the voltage provided through the DA1 channel of the DAC 104.

The LD driver 105 includes voltage amplifiers AMP1 through AMP4 which amplify voltages input into the LD driver 105 through four input ports, switches SW1 through SW4, and a transistor Q1. The LD driver 105 provides write and read power voltages to drive the LD 110.

Figure 2A:
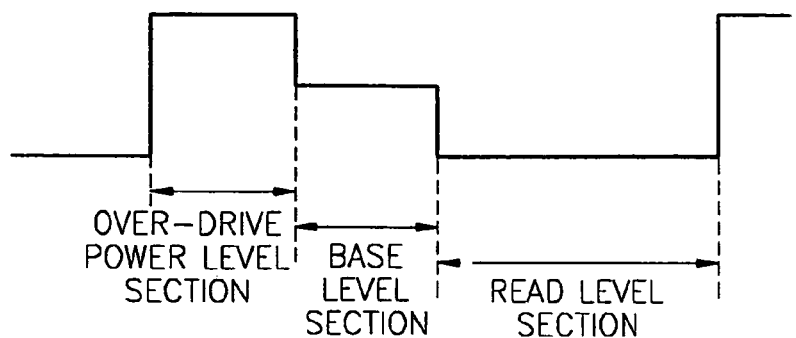
FIGS. 2A-2D are timing diagrams of control signals used to drive a laser diode (LD) driver shown in FIG. 1.
Figure 2B:
Figure 2C:
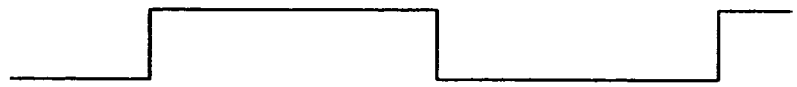

Suppose that the level of a write power voltage supplied to the LD 110 is divided into three different sections including an over-drive power level section, a base level section, and a read level section, as shown in FIG. 2A. To form one pit on a disk (not shown), the switch SW3 of the LD driver 105 begins to operate in response to a control signal for the over-drive power level section, which is provided from an encoder & decoder (ENDEC, not shown) as shown in FIG. 2B. The switches SW2 and SW4 begin to operate in response to a control signal for the base level section, which is provided from the ENDEC (not shown) as shown in FIG. 2C. The switch SW1 begins to operate in response to an enable signal for a read channel, which is provided from the controller 101 as shown in FIG. 2D.

Figure 2D:
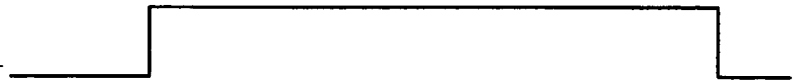

In other words, in the over-drive power level section, all the switches SW1 through SW4 of the LD driver 105 are turned on according to the levels of the signals shown in FIGS. 2B through 2D. In the base level section, all the switches SW1 through SW4 except for the switch SW3 are turned on according to the levels of the signals shown in FIGS. 2B through 2C. In the read level section, only the switch SW1 is turned on according to the levels of the signals shown in FIGS. 2B through 2D.

According to which switches are turned on or off, the sum of the voltages transmitted from the voltage amplifiers AMP1 through AMP4 varies, and is provided to the LD 110 through the transistor Q1 so as to provide enough write power to drive the LD 110.

In a case where a write power voltage is unstable, the controller 101 allows the write power, which drives the LD 110, to be provided to the LD 110 using the four channels DA1 through DA4 so as to have the LD 110 quickly reach a stable state.

On the other hand, in a case where the write power voltage is recognized as stable by the output signal (MPDO_SH) of the MPD 120 transmitted from the APC circuit 102 for a write channel, the controller 101 turns off the DA4 channel in order to prevent a predetermined percentage of an expected write power voltage from being output. The controller 101 can be realized to turn off the DA4 channel of the DAC 104 immediately. Alternatively, the controller 101 may be realized to turn off the DA4 channel by decreasing the level of a voltage output through the DA4 channel while simultaneously increasing the level of a voltage output through the DA2 channel, so as to have the level of the voltage output through the DA4 channel reach 0V.

When the DA4 channel is turned off, the DAC 104 does not output any signals using the DA4 channel, but outputs signals through the DA1 through DA3 channels. When the write power voltage is stable, the controller 101 allows the write power to be provided to the LD 110 by using the three channels, DA1 through DA3. Accordingly, after the optical output state of the LD 110 becomes stable, the controller 101 manages the DA1 through DA4 channels so as to have the DA4 channel, which is unnecessary during a section for performing the rest of the write mode, not be used.

Figure 3:
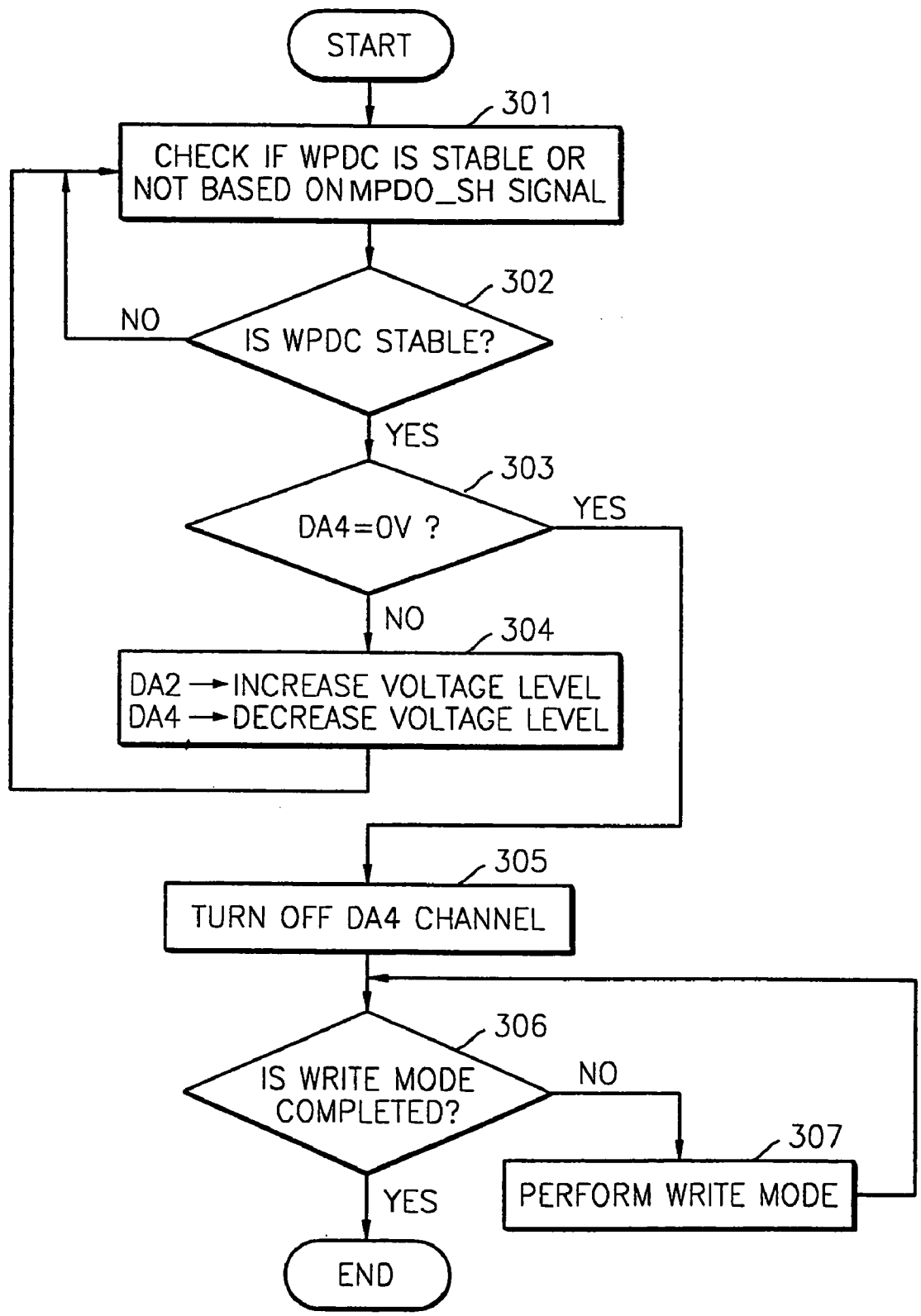
FIG. 3 is a flowchart illustrating a method of controlling the write power according to the present invention.

FIG. 3 shows a flowchart illustrating a method of controlling write power according to the present invention. Referring to FIGS. 1 and 3, whether a write power voltage is stable is checked based on the output signal (MPDO_SH) of the MPD 120 in operations 301 and 302. The operation 301 is the same as checking whether the optical output state of the LD 110 is stable, and is performed by determining whether there is a difference between the previous level of the output signal MPDO_SH of the MPD 120 and the current level of the output signal MPDO_SH of the MPD 120.

If the current level of the output signal MPDO_SH of the MPD 120 is determined as different from the previous level of the output signal MPDO_SH of the MPD 120 in the operation 302, the write power voltage is determined as unstable, and the operation 301 is performed again to check whether the write power voltage is stable.

When the write power voltage is unstable, the controller 101 allows the DA4 channel, as well as the other channels DA1 through DA3, to be used so as to have the level of the write power voltage provided to the LD 110 reach a stable state as soon as possible.

Where the level of the write power voltage is determined as stable in the operation 302, whether the level of voltage output through the DA4 channel is 0V is checked in operation 303. In response to the level of the voltage output through the DA4 channel not being 0V, voltage to be output through the DA2 channel of the DAC 104 is increased while voltage to be output through the DA4 channel is decreased, and the operation 301 is performed again. The voltage to be output through the DA2 channel may be increased as much as the voltage to be output through the DA4 channel is decreased. For example, in a case where the voltage to be output through the DA2 channel is increased by 5%, the voltage to be output through the DA4 channel may be decreased by 5%.

As described above, when the voltage output through the DA4 channel reaches 0V by adjusting the voltages output through the DA2 and DA4 channels, the DA4 channel is turned off in operation 305 so that the number (3) of channels used to control the write power can be smaller than the number (4) of channels used to control the write power when the level of the write power voltage is unstable.

Next, whether a write mode is completed is determined in operation 306. Where the write mode is completed, the whole procedure of controlling the write power is completed. However, where the write mode is not completed, the write mode is continuously performed in operation 307 until the write mode is completed.

Figure 4:
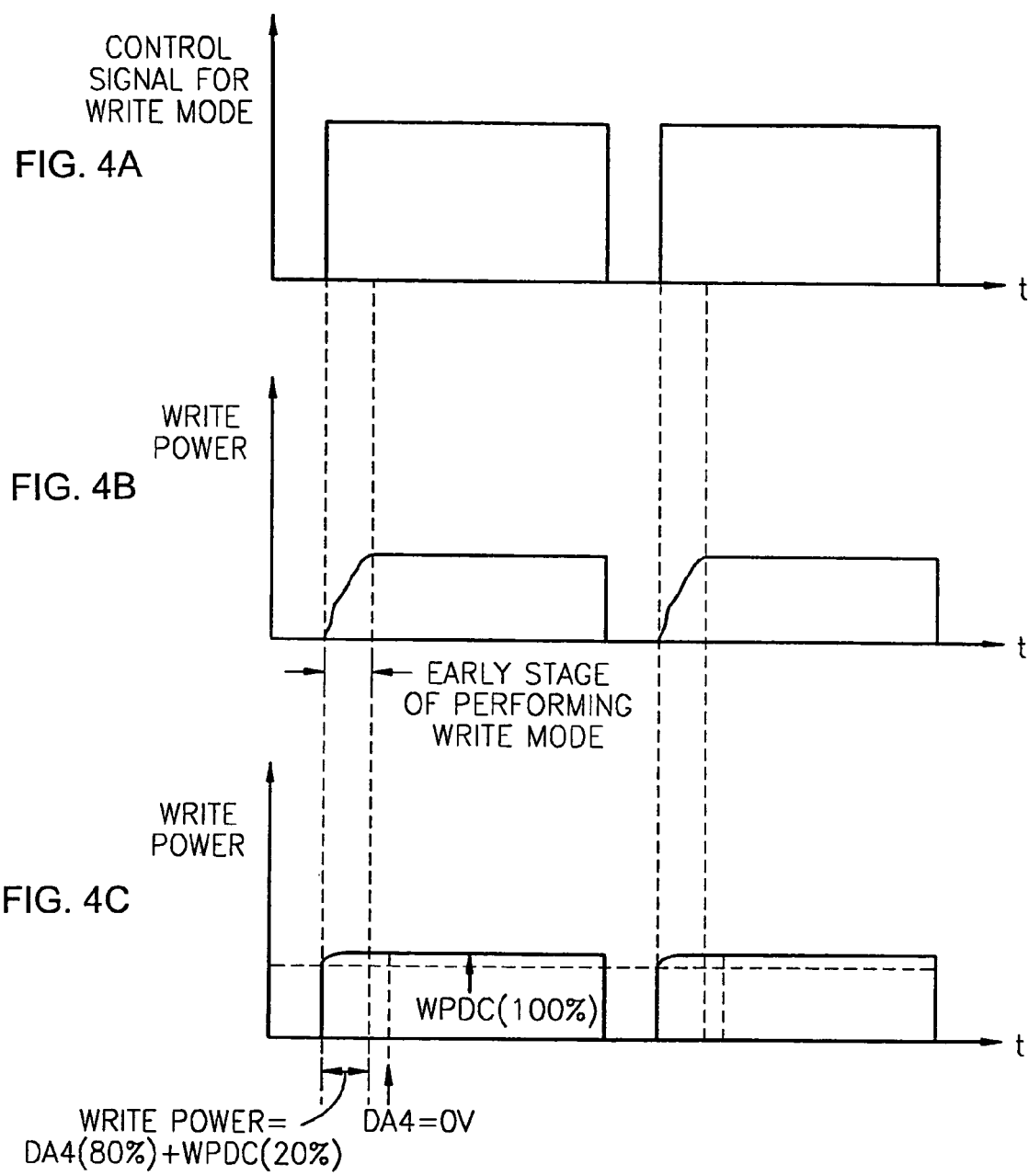
FIGS. 4A-4C are diagrams showing the relationship between a write mode control signal and a write power level.

FIGS. 4A through 4C show the relationship between a write mode control signal and a write power level according to the present invention.

Accordingly, even if the control signals are provided from the ENDEC (not shown) and the controller 101 to the LD driver 105, as shown in FIGS. 2B through 2D, the DA4 channel of the LD driver 105 cannot be used because it is turned off. Even if the level of the write power voltage is unstable at an early stage of a write mode, as shown in FIG. 4B, when the level of the control signal for a write mode is high, as shown in FIG. 4A, the level of the write power voltage provided to the LD 110 can be quickly stabilized by the write power voltage provided via the DA4 channel, as shown in FIG. 4C.

Where the level of the write power voltage provided to the LD 110 becomes stable, the levels of the write power voltages provided via the DA2 and DA4 channels are adjusted in the way described above with the operation 304. In response to the level of the write power voltage provided via the DA4 channel reaching 0 V, the DA4 channel is turned off. Accordingly, during the rest of the write mode, the level of the write power voltage provided to the LD 110 is stably maintained by the write power voltage WPDC, and the DA4 channel is not used.

Figure 5:
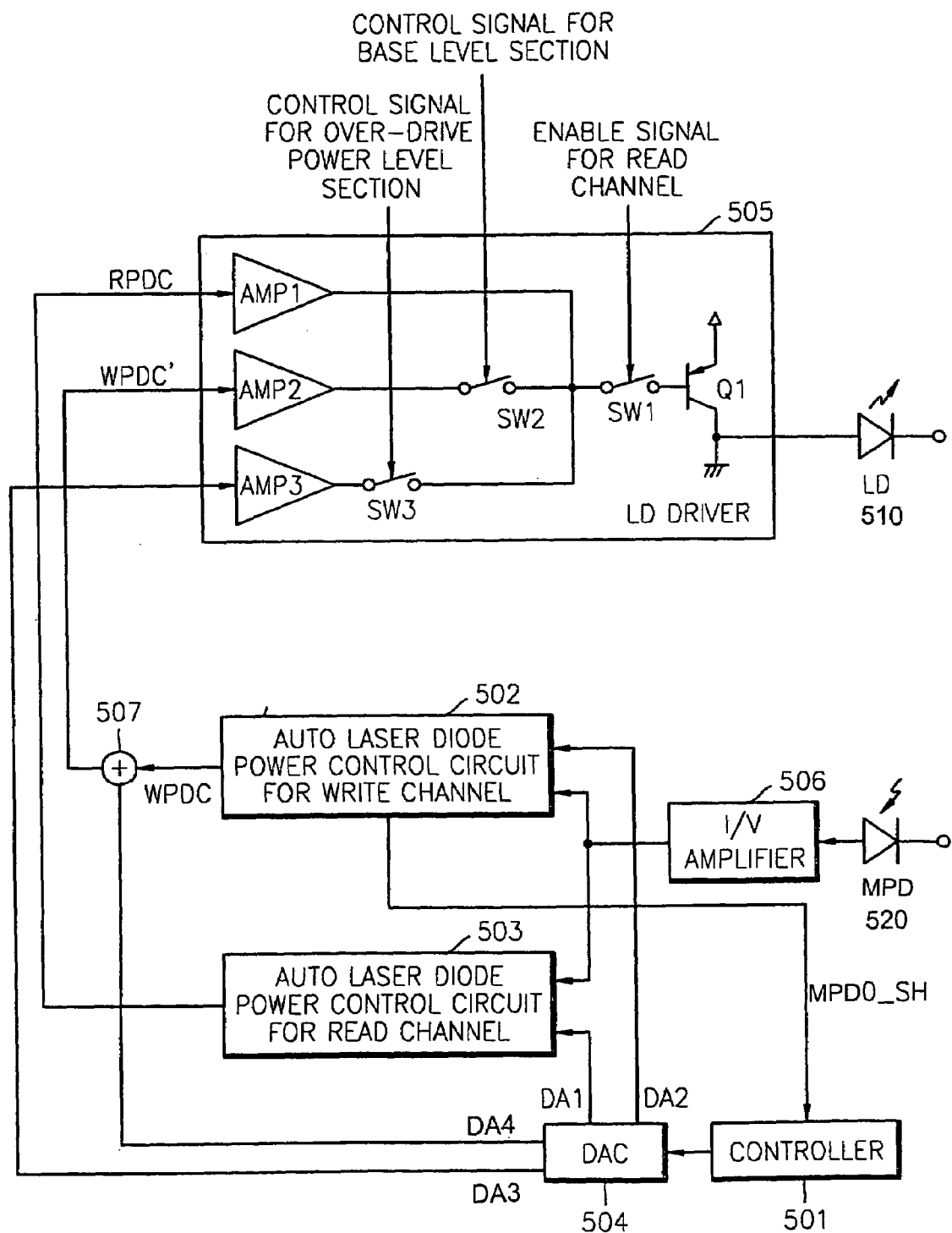
FIG. 5 is a block diagram of an apparatus which controls write power according to another embodiment of the present invention.

FIG. 5 shows an apparatus which controls write power according to another embodiment of the present invention. The apparatus includes an LD 510 which emits light toward a disk (not shown), a controller 501 which controls the write power to be provided to the LD 510, an APC circuit 502 for a write channel which provides a write power voltage, an APC circuit 503 for a read channel which provides a read power voltage, a DAC 504, an LD driver 505 which drives the LD 510, an I/V amplifier 506, and an MPD 520 which monitors the amount of the light emitted from the LD 510.

In the apparatus, the controller 501, the APC circuit 502 for a write channel, the APC circuit 503 for a read channel, the DAC 504, the I/V amplifier 506, and the adder 507 may be integrated into one chip. Alternatively, the controller 501, the APC circuit 502 for a write channel, the APC circuit 503 for a read channel, the DAC 504, and the adder 507 may be integrated into one chip. In addition, the adder 507 may be included in the APC circuit 502 for a write channel. A device having the adder 507, the APC circuit 502 for a write channel, the I/V amplifier 506, the DAC 504, and the controller 501 may be referred to as an apparatus which controls the write power in a broad sense. Alternatively, a device having the adder 507, the APC circuit 502 for a write channel, and the controller 501 may be referred to as an apparatus which control the write power in a narrow sense.

The LD 510, the MPD 520, the controller 501, the APC circuit 502 for a write channel, the APC circuit 503 for a read channel, the DAC 504, and the I/V amplifier 506 are the same as the corresponding elements of the apparatus which controls the write power shown in FIG. 1 in their structure and operation. Accordingly, their description will not be repeated below.

The adder 507 outputs a write power voltage WPDC', which is the sum of a write power voltage output via a DA4 channel of the DAC 504 and a write power voltage WPDC output from the APC circuit 502 for a write channel, to the LD driver 505. In other words, where the level of the write power voltage WPDC output from the APC circuit 502 for a write channel is unstable, the controller 501 manages DA1 through DA4 channels of the DAC 504 so as to have voltages output through the DA1 through DA4 channels. Accordingly, the adder 507 outputs the write power voltage WPDC', which is the sum of the write power voltage WPDC output from the APC circuit 502 for a write channel and the write power output from the DA4 channel. However, where the level of the write power voltage WPDC output from the APC circuit 502 for a write channel is stable, the controller 501 manages the DA1 through DA4 channels of the DAC 504 so that no voltage can be output via the DA4 channel. Accordingly, the adder 507 outputs the write power voltage WPDC output from the APC circuit 502 for a write channel as the write power voltage WPDC'. The write power voltage WPDC' output from the adder 507 is transmitted to the LD driver 505.

Unlike the LD driver 105 shown in FIG. 1, the LD driver 505 includes amplifiers AMP1 through AMP3 which amplify voltages input via three input ports, switches SW1 through SW3, and a transistor Q1, and provides the write power and read power to drive the LD 510.

Suppose that the level of a write power voltage supplied to the LD 510 is divided into three different sections including an over-drive power level section, a base level section, and a read level section. To form one pit on a disk (not shown), the switch SW3 of the LD driver 505 begins to operate in response to a control signal for the over-drive power level section, which is provided from an encoder & decoder (ENDEC, not shown), and the write power voltage output from the amplifier AMP3 is transmitted to the switch SW1. The switch SW2 begins to operate in response to a control signal for the base level section, which is provided from the ENDEC (not shown), and the write power voltage output from the amplifier AMP2 is transmitted to the switch SW1. The switch SW1 begins to operate in response to an enable signal for a read channel, which is provided from the controller 501, and the write power voltages output from the amplifiers AMP1 through AMP3 are transmitted to a base of the transistor Q1.

Figure 6:
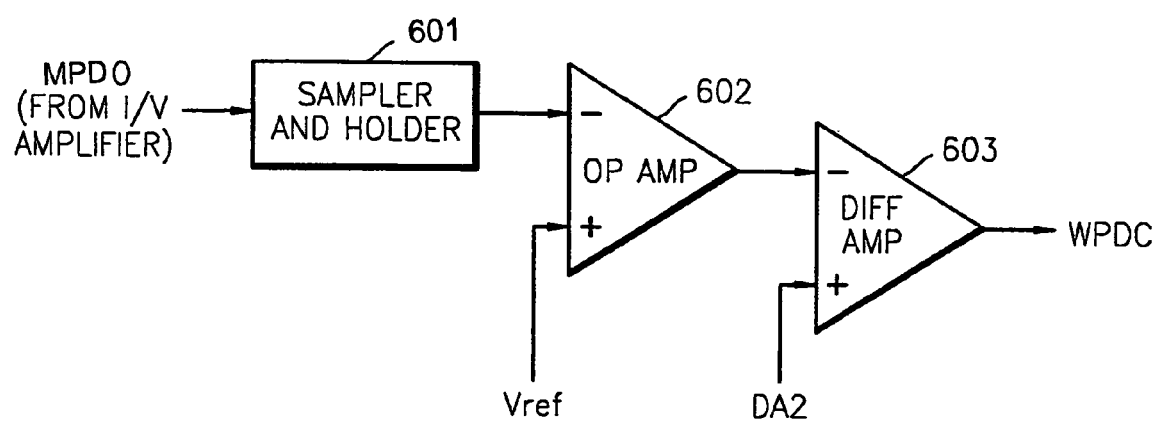
FIG. 6 is a block diagram illustrating an example of auto laser diode power control (APC) circuits shown in FIGS. 1 and 5.

FIG. 6 shows an example of the APC circuits 102 and 502 for a write channel shown in FIGS. 1 and 5. Referring to FIG. 6, the APC circuit 102 or 502 for a write power includes a sampler & holder 601, an operational amplifier (OP AMP) 602, and a differential amplifier (DIFF AMP) 603.

The sampler & holder 601 samples and holds a certain section of the voltage output from the I/V amplifier and outputs the sampled and held voltage MPDO_SH. The voltage MPDO_SH is transmitted to the operational amplifier 602.

The operational amplifier 602 amplifies the output MPDO_SH of the sampler & holder 601 using a reference voltage (Vref) and outputs the amplified voltage to the differential amplifier 603. The differential amplifier 603 compares the voltage transmitted from the operational amplifier 602 with the voltage transmitted via the DA2 channel of the DAC 104 or 504 and detects the difference between the two voltages. The differential amplifier 603 outputs the result of adding/subtracting the difference to/from the voltage transmitted via the DA2 channel as the write power voltage WPDC.

In other words, where the voltage output from the operational amplifier 602 is greater than the voltage transmitted via the DA2 channel, the differential amplifier 603 outputs the result of subtracting the difference from the voltage transmitted via the DA2 channel as the write power voltage WPDC. On the other hand, where the voltage output from the operational amplifier 602 is smaller than the voltage transmitted via the DA2 channel, the differential amplifier 603 outputs the result of adding the difference to the voltage transmitted via the DA2 channel as the write power voltage WPDC. According to the operations of the operational amplifier 602 and the differential amplifier 603, the variation of the write power in accordance with the variation of the temperature of the LD 110 or 510 can be compensated.

The embodiments of the present invention can be applied to an optical driver driven with write power for one pit, which is divided into an over-drive power level, an erase level, and a read level, as well as an optical driver driven with write power for one pit, which is divided into an over-drive power level, a base level, and a read level.

According to the present invention, the level of write power provided to a laser diode in a base level section (or an erase level section) can be rapidly stabilized using two channels as an optical driver resumes a write mode at a position where the write mode is stopped in an emergency or performs a normal write mode. In addition, where the level of the write power voltage becomes stable, the level of the write power voltage is controlled using one channel in the base level section (or the erase level section). Accordingly, it is possible to reduce the size of a firmware by preventing channels, which are unnecessary to perform a write mode, from being used. Furthermore, it is possible to control the level of the write power voltage to be lower than the level of a voltage set in a DA4 channel in a section where the write mode is performed and the write power voltage provided to the laser diode is maintained to be stable.

It is understood that the present invention can be applied to an LD driver for three channels as well as an LD driver for four channels.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An apparatus for controlling write power in an optical driver, comprising:
   a laser diode which emits light;
   a monitor photo diode which monitors the amount of the light emitted from the laser diode;
   a controller which determines whether the write power provided to the laser diode is stable based on a signal generated by sampling and holding a predetermined section of an output of the monitor photo diode, and controls the write power provided to the laser diode by adjusting the number of channels used according to whether the write power provided to the laser diode is stable;
   an amplifier which amplifies the output of the monitor photo diode;

a digital/analog converter having first, second, third and fourth channels, wherein the first, second, third and fourth channels transmit first reference, second reference, overdrive power and a predetermined percentage of an expected write power voltages, respectively;

a write channel APC (auto laser diode power control) circuit which provides a write channel voltage based on the signal and the first reference voltage, and provides the signal to the controller;

a read channel APC circuit which provides a read channel voltage based on the signal and the second reference voltage; and a laser diode driver which provides the write power corresponding to the write channel, read channel, overdrive power and the predetermined percentage of the expected write power voltages to drive the laser diode, wherein write channel APC circuit comprises:
a sampler and holder which samples and holds a predetermined section of a voltage corresponding to the output of the monitor photo diode;
an operational amplifier which amplifies the voltage output from the sampler and holder using a reference voltage; and
a differential amplifier which compares and determines the difference between the amplified voltage of the operational amplifier with the first reference voltage, wherein the differential amplifier outputs the result of subtracting the difference from the first reference voltage as the write channel voltage in response to the amplified voltage being greater than the first reference voltage, and outputs the result of adding the difference to the first reference voltage as the write channel voltage in response to the amplified voltage being smaller than the first reference voltage.

2. The apparatus of claim 1, wherein in response to the write power provided to the laser diode being stable, the controller controls the channels used to stabilize the write power provided to the laser diode so as to turn off a channel which provides a voltage as much as a predetermined percentage of expected write power.

3. The apparatus of claim 1, wherein the read channel APC circuit adjusts the read channel voltage so as to maintain output power of the laser diode at a desired level.

4. The apparatus of claim 1, wherein the write channel APC circuit adjusts the write channel voltage so as to maintain output power of the laser diode at a desired level.

5. The apparatus of claim 1, wherein the laser diode driver comprises switches, and an on or off state of the switches are manipulated to provide a desired write power to drive the laser diode.

6. The apparatus of claim 1, wherein in response to the write power provided to the laser diode being unstable, the controller allows the write power to be provided to the laser diode using the first, second, third and fourth channels, so as to stabilize the write power provided to the laser diode at a rapid rate.

7. The apparatus of claim 1, wherein in response to the write power provided to the laser diode being stable, the controller turns off the fourth channel, or decreases the predetermined percentage of the expected write power voltage while simultaneously increasing the first reference voltage so as to have the predetermined percentage of the expected write power voltage output through the fourth channel reach 0V.

8. The apparatus of claim 1, wherein the write power is divided into an over-drive power level, an erase level and a read level, or the over-drive power level, a base level and the read level.

9. An apparatus for controlling write power in an optical driver, comprising:
a laser diode which emits light;
a monitor photo diode which monitors the amount of light emitted from the laser diode;
a write channel auto laser diode power control circuit which samples and holds a predetermined section of an output of the monitor photo diode, and outputs a write channel voltage, which is capable of maintaining output power of the laser diode at a certain level, by using a signal obtained by sampling and holding the predetermined section of the output of the monitor photo diode and a first reference voltage;
a read channel auto laser diode power control circuit which outputs a read channel voltage, which is capable of maintaining the output power of the laser diode at a particular level, by using the output of the monitor photo diode and a second reference voltage;
a controller which determines whether the write power provided to the laser diode is stable based on the signal generated by sampling and holding the predetermined section of the output of the monitor photo diode, and controls the write power provided to the laser diode by adjusting the number of channels used according to whether the write power provided to the laser diode is stable;
a digital/analog converter which outputs the first and second reference voltages to the write channel auto laser diode power control circuit and the read channel auto laser diode power control circuit, respectively, under the control of the controller, and outputs an over-drive power voltage and a voltage which is as much as a predetermined percentage of expected write power;
an adder which adds the write channel voltage to the voltage output from the digital/analog converter and outputs an added voltage thereof; and
a laser diode driver which provides the write power and/or read power to drive the laser diode by using the added voltage, the read channel voltage, and the over-drive power voltage output from the adder, the read channel auto laser diode power control circuit, and the digital/analog converter.

10. The apparatus of claim 9, wherein the controller, the write channel auto laser diode power control circuit, the read channel auto laser diode power control circuit, the digital/analog converter, and the adder are integrated into one chip.

11. The apparatus of claim 9, wherein the adder is included in the write channel auto laser diode power control circuit.

12. The apparatus of claim 9, further comprises an amplifier which amplifies the output of the monitor photo diode, wherein the controller, the write channel auto laser diode power control circuit, the read channel auto laser diode power control circuit, the digital/analog converter, the adder, and the amplifier are integrated into one chip.

13. The apparatus of claim 9, wherein the write power is divided into an over-drive power level, an erase level and a read level, or the over-drive power level, a base level and the read level.

14. The apparatus of claim 9, wherein the write channel APC circuit comprises:

a sampler and holder which samples and holds a predetermined section of a voltage corresponding to the output of the monitor photo diode;

an operational amplifier which amplifies the voltage output from the sampler and holder using a reference voltage; and a differential amplifier which compares and determines the difference between the amplified voltage of the operational amplifier with the first reference voltage, wherein the differential amplifier outputs the result of subtracting the difference from the first reference voltage as the write channel voltage in response to the amplified voltage being greater than the first reference voltage, and outputs the result of adding the difference to the first reference voltage as the write channel voltage in response to the amplified voltage being smaller than the first reference voltage.

* * * * *